I. LONG.
Coffee Roaster.
No. 89,934.
Patented May 11, 1869.
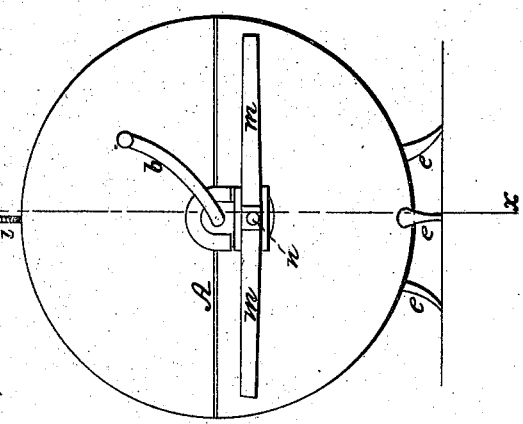
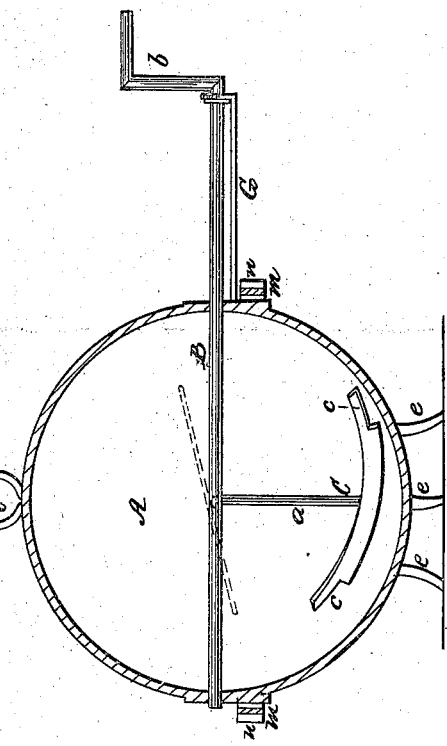
Witnesses:
Inventor:

United States Patent Office.

ISRAEL LONG, OF TERRE HAUTE, INDIANA.

Letters Patent No. 89,934, dated May 11, 1869.

---

COFFEE-ROASTER.

---

The Schedule referred to in these Letters Patent and making part of the same.

---

*To all whom it may concern:*

Be it known that I, ISRAEL LONG, of Terre Haute, in the county of Vigo, and State of Indiana, have invented a new and improved Coffee-Roaster; and I do hereby declare that the following is a full, clear, and exact description of the construction and operation of the same, reference being had to the accompanying drawings, making a part of this specification, in which—

Figure 1 is a section through line $x\ x$ of fig. 2.

Figure 2 is an end view.

This invention comprises a new method of adjusting the height of the vessel from the fire, together with a new and improved construction of stirrer.

In the drawings—

A indicates the vessel in which the coffee is roasted, it being in the form of a hollow globe, the upper half of which is removable.

In connection with this globe, a shaft, B, is employed, having a crank, $b$, and, by means of an arm, $a$, supporting the stirrer C. The latter is in the form of a curved plate, with convex outer edge, fitted to the curve of the concave wall of the globe, and arranged obliquely with reference to its line of motion, so that as it is carried round by the revolution of the shaft, it does not force the kernels of coffee round before it, but simply moves them out of their place, causing them to slide along the inclined plate till they escape from the end of it, or pass through the recesses $c\ c$, which will be observed in its under edge.

If the shaft is rocked instead of being rotated, the inclined plate will first force the kernels to one side, causing them to slide toward one end of the instrument, and then, on its return, will force them to the other side, causing them to slide toward the other end, thus bringing them in contact with every part of the heated bottom of the globe, and rapidly and uniformly cooking them to the degree required.

It is obvious that the concave bottom of the globe essentially aids the stirrer in producing this effect.

The globe is designed to sit like a pot in the holes of the stove or range, or on the fire in a fire-place.

In order to adapt it, therefore, to being conveniently regulated in height, so as to adjust it to the heat required, I provide it with two legs, $m\ m$, at each end, expanding and shutting together like a pair of compasses, and having a screw-nut, $n$, on the outer end of their pivot-pin, which, when tightly screwed in, clamps the legs firmly in any position required.

When clamped in nearly a horizontal position, as seen in the drawings, they allow the globe to sit low in the stove-holes or on the coals, and receive the full effect of the fire.

When their outer ends are brought nearer together, and the legs assume the form of an inverted V, they correspondingly raise the globe away from the fire.

$e\ e$ are short legs attached to the bottom of the globe, upon which it sits when taken out of the stove-holes, and $i$ is a handle, by which the cover can be removed, when necessary.

G is a supporting-bar, which strengthens the instrument, and enables the operator to lift it and move it about by means of the shaft or crank $b$, as a handle, without any danger of breaking.

Having thus described my invention,

What I claim as new, and desire to secure by Letters Patent, is—

1. The compass legs, in combination with the screw-nut, when applied to a coffee-roaster, substantially as and for the purpose specified.

2. As an article of manufacture, the whole device above described, consisting essentially of the globe A, handle $i$, legs $e\ e\ e$, compass legs $m\ m$, screw-nut $n$, crank $b$, shaft B, arm $a$, and oblique plate C, all constructed, arranged, and adapted to operate substantially as and for the purposes set forth.

ISRAEL LONG.

Witnesses:
THOMAS B. LONG,
SAMUEL ROYSE.